(12) United States Patent
Ko et al.

(10) Patent No.: US 11,460,104 B2
(45) Date of Patent: Oct. 4, 2022

(54) ELECTRONIC SHIFT LEVER

(71) Applicant: HYUNDAI KEFICO CORPORATION, Gyeonggi-do (KR)

(72) Inventors: Jae Yu Ko, Seoul (KR); Su Won Kim, Gyeonggi-do (KR); Ji Hwan Oh, Seoul (KR); Chan Woo Lee, Gyeonggi-do (KR)

(73) Assignee: Hyundai Kefico Corporation, Gyeonggi-Do (KR)

( * ) Notice: Subject to any disclaimer, the term of this patent is extended or adjusted under 35 U.S.C. 154(b) by 224 days.

(21) Appl. No.: 17/022,790

(22) Filed: Sep. 16, 2020

(65) Prior Publication Data

US 2021/0088127 A1 Mar. 25, 2021

(30) Foreign Application Priority Data

Sep. 20, 2019 (KR) .................. 10-2019-0116104

(51) Int. Cl.
| | |
|---|---|
| *F16H 61/28* | (2006.01) |
| *F16H 59/10* | (2006.01) |
| *G01B 7/30* | (2006.01) |
| *G01D 5/14* | (2006.01) |
| *F16H 61/32* | (2006.01) |

(52) U.S. Cl.
CPC ........... *F16H 61/28* (2013.01); *F16H 59/105* (2013.01); *G01B 7/30* (2013.01); *G01D 5/145* (2013.01); *F16H 2061/326* (2013.01)

(58) Field of Classification Search
CPC ..... F16H 61/28; F16H 61/32; F16H 2061/326
USPC ...................................... 74/473.12
See application file for complete search history.

(56) References Cited

U.S. PATENT DOCUMENTS

| 10,910,911 | B2 * | 2/2021 | Shirai | ............... H02K 5/24 |
| 2004/0072646 | A1 * | 4/2004 | Hori | ............... H02K 19/103 |
| | | | | 475/149 |
| 2005/0215375 | A1 * | 9/2005 | Kimura | ............... F16H 1/32 |
| | | | | 475/149 |
| 2005/0218860 | A1 * | 10/2005 | Kimura | ............... H02K 19/103 |
| | | | | 318/712 |
| 2005/0218861 | A1 * | 10/2005 | Kimura | ............... H02K 11/215 |
| | | | | 318/712 |

(Continued)

FOREIGN PATENT DOCUMENTS

| KR | 101908131 B1 | 10/2018 |
| KR | 101990386 B1 | 6/2019 |
| WO | 2018/003085 A1 | 1/2018 |

*Primary Examiner* — Joseph Brown
(74) *Attorney, Agent, or Firm* — Fox Rothschild LLP

(57) ABSTRACT

An electronic shift lever includes a motor part configured to generate a driving force according to an input signal from a controller which receives an input signal from a user, an output shaft assembly coupled to the motor part and rotated by a driving force of the motor part, a manual shaft coupled to the output shaft assembly and configured to receive the driving force of the motor part, a support member disposed between the motor part and the output shaft assembly and between the housing and the output shaft assembly, a magnet rotor having a first end into which the output shaft assembly is inserted and a second end through which the manual shaft passes, a Hall sensor configured to detect a rotational position of the magnet rotor, and the housing which accommodates the motor part, the output shaft assembly, the support member, and the Hall sensor.

9 Claims, 3 Drawing Sheets

(56) References Cited

U.S. PATENT DOCUMENTS

| | | | |
|---|---|---|---|
| 2006/0163025 A1* | 7/2006 | Hori | H02P 25/08 |
| | | | 192/219.5 |
| 2006/0201768 A1* | 9/2006 | Hori | F16H 61/16 |
| | | | 192/84.1 |
| 2006/0232393 A1* | 10/2006 | Kimura | F16H 61/32 |
| | | | 340/456 |
| 2006/0276300 A1* | 12/2006 | Kashiwagi | F16H 61/32 |
| | | | 477/34 |
| 2007/0044583 A1* | 3/2007 | Hori | F16H 61/32 |
| | | | 74/335 |
| 2007/0046243 A1* | 3/2007 | Hori | F16H 61/32 |
| | | | 318/630 |
| 2008/0302628 A1* | 12/2008 | Kimura | F16H 63/3433 |
| | | | 192/220 |
| 2009/0000411 A1* | 1/2009 | Nakayama | F16H 63/3466 |
| | | | 74/335 |
| 2009/0058208 A1* | 3/2009 | Kimura | H02K 5/1732 |
| | | | 310/83 |
| 2009/0120222 A1* | 5/2009 | Kimura | F16H 61/32 |
| | | | 74/335 |
| 2010/0170355 A1* | 7/2010 | Kume | F16H 61/32 |
| | | | 29/428 |
| 2013/0110365 A1* | 5/2013 | Kimura | F16H 61/12 |
| | | | 701/65 |
| 2016/0102761 A1* | 4/2016 | Kuwahara | F16H 61/24 |
| | | | 74/473.12 |
| 2017/0152942 A1* | 6/2017 | Makino | H02K 1/146 |
| 2018/0223973 A1* | 8/2018 | Uematsu | H02K 11/215 |
| 2020/0173539 A1* | 6/2020 | Nakamura | F16H 61/32 |
| 2021/0031828 A1* | 2/2021 | Hyun | F16H 61/32 |

* cited by examiner

ELECTRONIC SHIFT LEVER

CROSS-REFERENCE TO RELATED APPLICATION

This application claims under 35 U.S.C. § 119(a) the benefit of Korean Patent Application No. 10-2019-0116104, filed on Sep. 20, 2019, the entire contents of which are incorporated herein by reference.

BACKGROUND

1. Technical Field

The present disclosure relates to an electronic shift lever, more particularly, to the electronic shift lever which allows a shift gear of a target transmission range to be automatically operated within a gear shift range which is set according to a driving speed of a vehicle.

2. Description of the Related Art

Generally, in order to perform a gear shift, an automatic transmission generates a gear ratio using a hydraulic circuit, a planetary gear, and friction elements, and a transmission control unit (TCU) controls such components.

Meanwhile, unlike a mechanical transmission system which is operated through an existing mechanical mechanism, a shift-by-wire (SBW) system is a transmission system in which various parts, that is, cables, mechanical manual valves, mechanical parking mechanisms, and the like, are omitted. The SBW system is a system in which, when a sensor value generated during an operation of an electronic shift lever or a button is transmitted to the TCU, a solenoid or an electric motor is operated in response to an electronic signal commanded by the TCU, and a hydraulic pressure is applied to a hydraulic pressure circuit for each shift stage or blocked therefrom due to operation of the solenoid or the electric motor so that transmission control is electronically performed.

Therefore, a SBW-based automatic transmission transmits a gear shift intent of a driver to the TCU as an electric signal through a simplified operation of the electronic shift lever or the button so that there is an advantage in that a gear shift operation to a drive (D) range, a reverse (R) range, a neutral (N) range, or a parking (P) range can be performed more easily, and miniaturization of a shift lever is possible to secure a large space between a driver seat and a passenger seat.

In the SBW system, when an output shaft is rotated, a magnet rotor assembled with the output shaft is also rotated together therewith so that a Hall sensor reads position information of the output shaft as output information through a magnetic body mounted in a magnet rotor and finally outputs the position information of the output shaft to a controller.

However, when the output shaft and the magnet rotor are integrally formed and a manual shaft is assembled with the output shaft and the magnet rotor, a clearance occurs due to a gap. Thus, when the output shaft and the magnet rotor are rotated, abrasion occurs between the output shaft, the magnet rotor, and the manual shaft such that a clearance phenomenon occurs.

Consequently, there is a problem in that a position of the output shaft is distorted.

In addition, since each of the output shaft and the manual shaft is made of a metal material, when the output shaft and the manual shaft are coupled in a mutual press-fit manner so as to avoid the above-described clearance phenomenon, even when the output shaft and the manual shaft should be disassembled, there is a problem in that the output shaft and the manual shaft are not disassembled.

SUMMARY

The present disclosure is directed to providing an electronic shift lever which allows robustness of an output shaft and a manual shaft to be improved.

According to an aspect of the present disclosure, there is provided an electronic shift lever including a motor part including a case, in which a first insertion hole is formed in an upper portion of the case, and a motor shaft configured to pass through the first insertion hole, an output shaft assembly coupled to the motor part and rotated by a driving force of the motor part, a manual shaft coupled to the output shaft assembly and configured to receive the driving force of the motor part, a support member disposed between the motor part and the output shaft assembly and between a housing and the output shaft assembly, a magnet rotor having a first end into which the output shaft assembly is inserted and a second other end through which the manual shaft passes, a Hall sensor configured to detect a rotational position of the magnet rotor, and the housing which accommodates the motor part, the output shaft assembly, the support member, and the Hall sensor.

The output shaft assembly may include a first gear in which a second insertion hole, through which the motor shaft passes, is formed, and a second gear which is in surface contact with the first gear and which includes a first coupling hole into which the motor shaft passing through the first gear is inserted is formed in an upper portion of the second gear and a second coupling hole into which the manual shaft is inserted is formed in a lower portion of the second gear, and the support member may include a first bearing disposed between the motor shaft and the first insertion hole, a second bearing disposed between the motor shaft and the second insertion hole, a third bearing disposed between the motor shaft and the first coupling hole, and a fourth bearing disposed between the housing and an outer circumferential surface of the second gear.

The support member may support the motor shaft against external forces in radial, axial, and tangential directions.

An inner diameter of the second insertion hole of the first gear may be greater than an inner diameter of the first coupling hole of the second gear.

The magnet rotor may include a body portion which constitutes a body and has a mounting groove formed in an outer circumferential surface of the body portion, and a magnetic body mounted in the mounting groove, and the magnetic body may be coupled to the mounting groove by an insert injection method.

An identification groove may be formed collinearly with the mounting groove in a lower surface of the body portion in a vertical direction.

A first end of the manual shaft may be coupled to an output shaft and a second end of the manual shaft is coupled to a detent lever which shifts parking (P)/reverse (R)/neutral (N)/drive (D) stages of a transmission according to an input signal from a controller.

A through-hole may be formed in a lower portion of the housing to allow an interior of the housing to communicate with the outside thereof, and a lower portion of the magnet rotor may be mounted in the through-hole.

An oil seal may be disposed between an outer circumferential surface of the lower portion of the magnet rotor and an inner circumferential surface of the through-hole.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
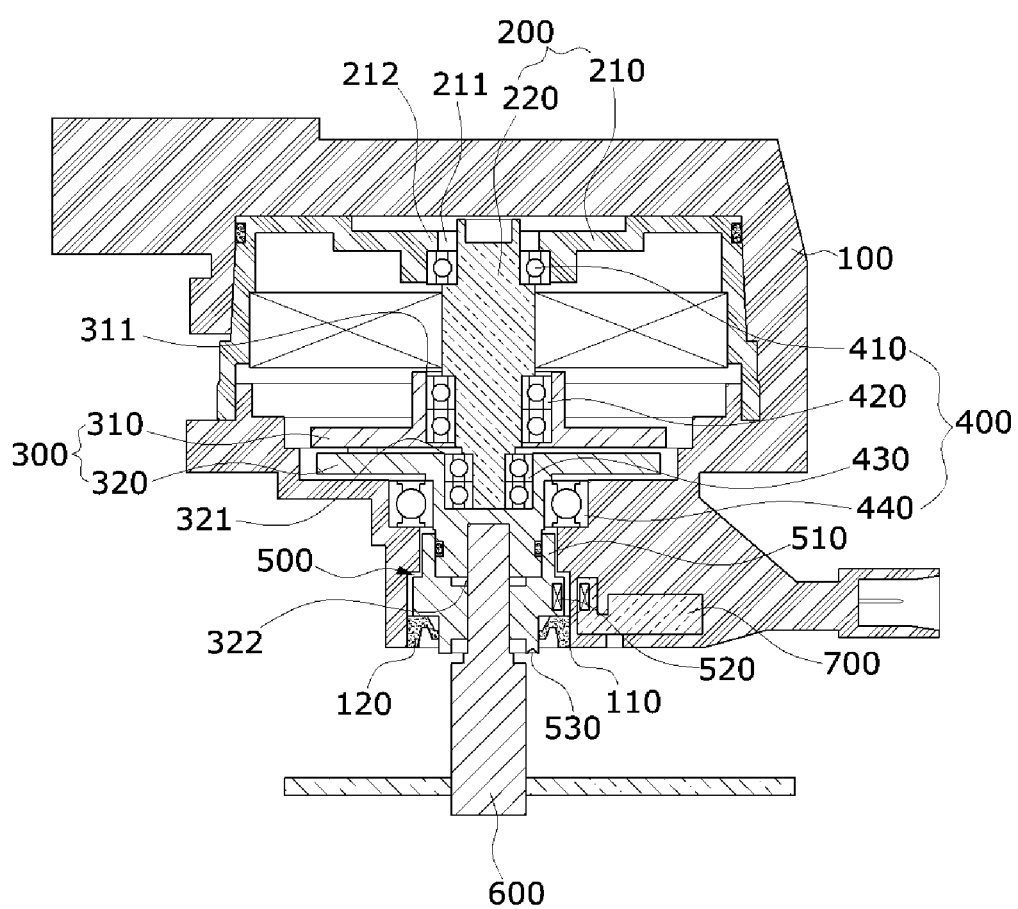
FIG. 1 is a cross-sectional view illustrating an electronic shift lever according to one embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Advantages and features of the present disclosure and methods for achieving them will be made clear from embodiments described in detail below with reference to the accompanying drawings. However, the present disclosure may be embodied in many different forms and should not be construed as being limited to the embodiments set forth herein. Rather, these embodiments are provided so that this disclosure will be thorough and complete and will fully convey the scope of the present disclosure to those of ordinary skill in the technical field to which the present disclosure pertains. The present disclosure is defined by the claims. Meanwhile, terms used herein are for the purpose of describing the embodiments and are not intended to limit the present disclosure. As used herein, the singular forms include the plural forms as well unless the context clearly indicates otherwise. The term "comprise" or "comprising" used herein does not preclude the presence or addition of one or more other elements, steps, operations, and/or devices other than stated elements, steps, operations, and/or devices.

Hereinafter, exemplary embodiments of the present disclosure will be described in detail with reference to the accompanying drawings.

Figure 2:
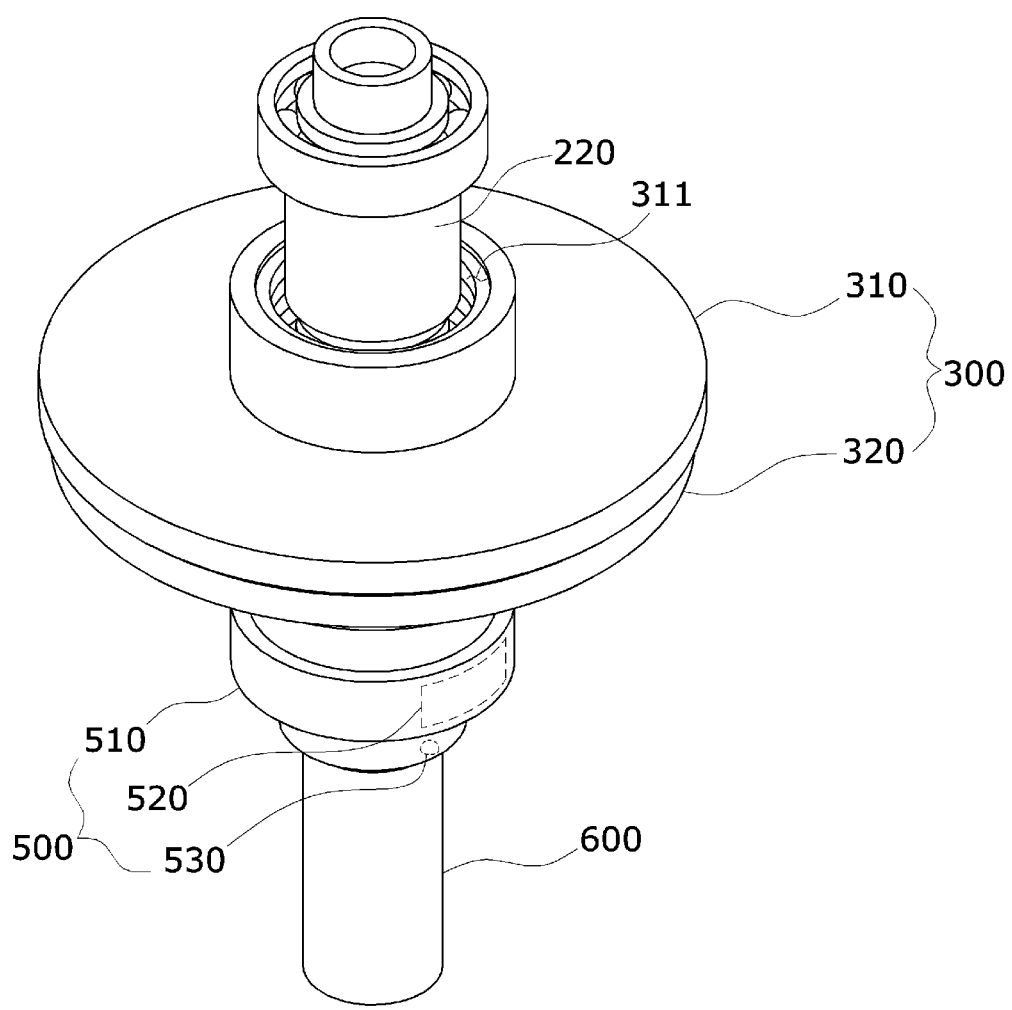
FIG. 2 is a perspective view illustrating an output shaft assembly, a support member, and a magnet rotor according to one embodiment of the present disclosure.
Figure 3:
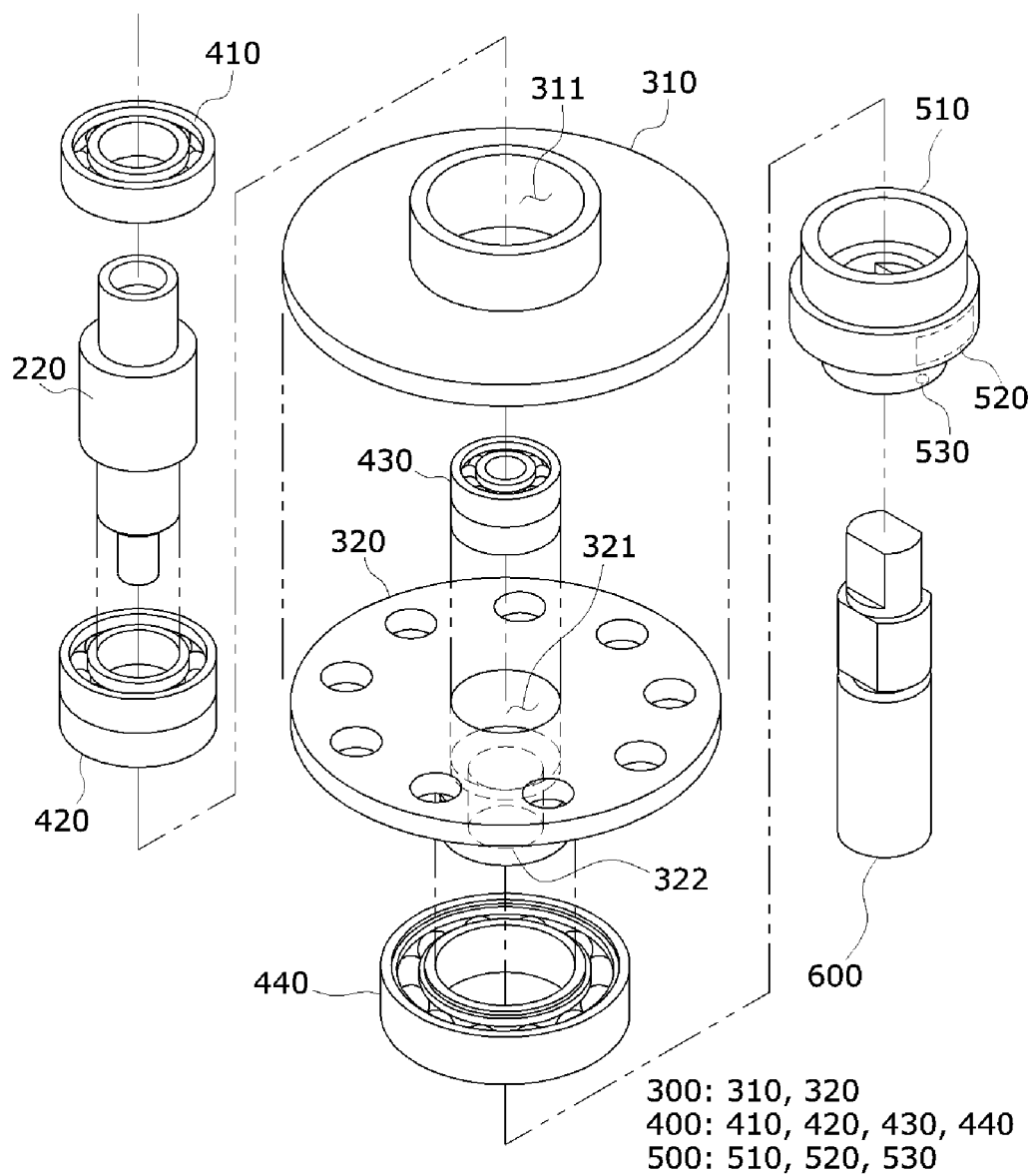
FIG. 3 is an exploded view illustrating a state in which the output shaft assembly, the support member, and the magnet rotor are disassembled according to one embodiment of the present disclosure.

FIG. 1 is a cross-sectional view illustrating an electronic shift lever according to one embodiment of the present disclosure, FIG. 2 is a perspective view illustrating an output shaft assembly, a support member, and a magnet rotor according to one embodiment of the present disclosure, and FIG. 3 is an exploded view illustrating a state in which the output shaft assembly, the support member, and the magnet rotor are disassembled according to one embodiment of the present disclosure.

Referring to FIGS. 1 to 3, an electronic shift lever according to one embodiment of the present disclosure includes a housing 100, a motor part 200, an output shaft assembly 300, a support member 400, a magnet rotor 500, a manual shaft 600, and a Hall sensor 700.

The housing 100 accommodates various components such as the motor part 200, the output shaft assembly 300, the support member 400, and the Hall sensor 700 and blocks foreign materials from being introduced from the outside.

In addition, the housing 100 protects the various components accommodated therein from an external impact.

The motor part 200 is accommodated in the housing 100 and generates a driving force according to an input signal of a controller which receives an input signal from a user.

The motor part 200 may include a case 210 and a motor shaft 220.

The case 210 is accommodated in the housing 100, and the motor shaft 220 passes through an interior of the case 210.

To this end, a first insertion hole 211 through which the motor shaft 220 passes to be inserted into the case 210 is formed in an upper portion of the case 210.

The motor shaft 220 is inserted into the case 210 by passing through the first insertion hole 211 and is rotated by the driving force of the motor part 200.

The output shaft assembly 300 is coupled to a lower portion of the motor shaft 220.

The output shaft assembly 300 preferably is made of a metal material and accommodated in the housing 100. As described above, the output shaft assembly 300 is coupled to the lower portion of the motor shaft 220 of the motor part 200 and is selectively rotated due to the driving force of the motor part 200 according to the input signal of the controller which receives the input signal from the user.

The output shaft assembly 300 includes a first gear 310 and a second gear 320.

A second insertion hole 311 into which the motor shaft 220 of the motor part 200 passes through to be inserted is formed in the first gear 310, and the first gear 310 is selectively rotated together with the motor shaft 220 when the motor shaft 220 is rotated due to the driving force of the motor part 200.

In addition, the second gear 320 is in surface contact with the first gear 310. A first coupling hole 321 into which the motor shaft 220 passing through the first gear 310 is inserted so that the second gear 320 and the motor shaft 220 are mutually coupled is formed in an upper portion of the second gear 320. A second coupling hole 322 into which the manual shaft 600 is inserted so that the second gear 320 and the manual shaft 600 are mutually coupled is formed in a lower portion of the second gear 320.

Consequently, when the motor shaft 220 is rotated due to the driving force of the motor part 200, the second gear 320 is rotated together with the first gear 310.

Meanwhile, an inner diameter of the second insertion hole 311 of the first gear 310 is greater than an inner diameter of the first coupling hole 321 of the second gear 320.

The support member 400 is disposed between the motor shaft 220 of the motor part 200 and the output shaft assembly 300 and between the housing 100 and the output shaft assembly 300. When the first gear 310 and the second gear 320 of the output shaft assembly 300 are rotated due to the driving force of the motor part 200, the support member 400 allows the first gear 310 and the second gear 320 to be smoothly rotated in the housing 100.

In particular, the support member 400 allows the motor shaft 220, which passes through the first gear 310 constituting the output shaft assembly 300 to be inserted into the second gear 320, to be strongly supported on the output shaft assembly 300 and allows the magnet rotor 500 to be strongly supported on the housing 100.

In particular, the support member 400 strongly supports the motor shaft 220 against external forces in radial, axial, and tangential directions.

The support member 400 includes a first bearing 410, a second bearing 420, a third bearing 430, and a fourth bearing 440.

The first bearing 410 is disposed between the motor shaft 220 of the motor part 200 and the first insertion hole 211 of the case 210, the second bearing 420 is disposed between the motor shaft 220 of the motor part 200 and the second insertion hole 311 of the first gear 310, the third bearing 430 is disposed between the motor shaft 220 passing through the second insertion hole 311 and the first coupling hole 321 of the second gear 320, and the fourth bearing 440 is disposed between the outer circumferential surface of the second gear 320 and the housing 100.

Consequently, the support member 400 may support both of the magnet rotor 500 and the motor shaft 220 of the motor part 200 inserted into the output shaft assembly 300, thereby improving robustness of the output shaft assembly 300 and the magnet rotor 500.

Meanwhile, a release prevention bump 212 for preventing the first bearing 410 from being released to the outside is formed above the first insertion hole 211 in which the first bearing 410 is disposed.

That is, an inner diameter of the first insertion hole 211 is equal to an outer diameter of the first bearing 410, and an inner diameter of the release prevention bump 212 is smaller than an inner diameter of the first bearing 410.

Consequently, it is possible to effectively block the first bearing 410 accommodated in the first insertion hole 211 from being released to the outside of the first insertion hole 211.

The magnet rotor 500 is assembled inside the housing 100 with a lower end of the housing 100. The output shaft assembly 300, specifically, a lower portion of the second gear 320, is inserted into a first end of the magnet rotor 500, and the manual shaft 600 passes through a second end of the magnet rotor 500.

Therefore, the magnet rotor 500 may be rotated together with the output shaft assembly 300 and may easily transmit a rotational force of the output shaft assembly 300 to the manual shaft 600.

In addition, the magnet rotor 500 allows the Hall sensor 700 located on one side of to the magnet rotor 500 to recognize a rotational position of the manual shaft 600.

To this end, the magnet rotor 500 includes a body portion 510, a magnetic body 520, and an identification groove 530.

The body portion 510 constitutes a body of the magnet rotor 500 and is preferably made of a material such as plastic. A mounting groove is formed in an outer circumferential surface of the body portion 510 and thus the magnetic body 520 is mounted in the mounting groove.

The magnetic body 520 is mounted in the mounting groove of the body portion 510. When the body portion 510 is rotated with the output shaft assembly 300, the magnetic body 520 allows the Hall sensor 700 to detect the magnetic body 520 and recognize the rotational position of the manual shaft 600.

The magnetic body 520 is coupled to the mounting groove of the body portion 510 by an insert-injection method.

Consequently, when the body portion 510 is rotated, the magnetic body 520 may be effectively prevented from being released from the body portion 510 to the outside.

The identification groove 530 is a circular groove formed in a lower surface of the body portion 510 and is formed in the lower surface of the body portion 510 to be collinear with the mounting groove in a vertical direction.

The identification groove 530 is formed collinearly with the magnetic body 520, which is mounted in the mounting groove of the body portion 510, in the vertical direction so that, even after the magnet rotor 500 is assembled with the housing 100, a position of the magnetic body 520 mounted on the outer circumferential surface of the body portion 510 may be easily determined.

Therefore, when the magnet rotor 500 is coupled to the manual shaft 600 to which a detent lever is coupled, a coupling position of the manual shaft 600 may be easily determined through the identification groove 530 to allow the manual shaft 600 to be coupled to the magnet rotor 500 so as to allow the position of the magnetic body 520, which is mounted on an outer circumferential surface of the magnet rotor 500 and detected by the Hall sensor 700, to correspond to a rotational position of the detent lever.

Meanwhile, in order to easily determine a position of the identification groove 530 formed in a lower surface of the magnet rotor 500, a through-hole 110 is formed in the lower surface of the housing 100 to which the magnet rotor 500 is coupled.

The through-hole 110 is formed in a lower portion of the housing 100 to allow an interior of the housing 100 to communicate with the outside thereof.

The through-hole 110 allows the lower surface of the magnet rotor 500 to be exposed to the outside.

Therefore, as described above, even after the magnet rotor 500 is assembled with the housing 100, the through-hole 110 allows the position of the identification groove 530 formed in the lower surface of the magnet rotor 500 to be easily determined so that the position of the magnetic body 520 mounted on the outer circumferential surface of the body portion 510 may be easily determined. In addition, it is possible to easily determine the position of the manual shaft 600 to which the detent lever is coupled to allow the manual shaft 600 to be coupled to the magnet rotor 500.

It is preferable that the oil seal 120 is disposed between the through-hole 110 and the magnet rotor 500.

Consequently, the oil seal 120 may maintain airtightness between the magnet rotor 500 and the through-hole 110, thereby blocking foreign materials from being introduced into the housing 100 from the outside.

In addition, an O-ring may be disposed between the magnet rotor 500 and the output shaft assembly 300, specifically, the second gear 320.

Consequently, a driving force is generated in the motor part 200 according to the input signal of the controller which receives the input signal from the user and, when the output shaft assembly 300 is rotated, the magnet rotor 500 and the output shaft assembly 300 may be simultaneously rotated to reduce a driving loss due to friction of the O-ring.

The manual shaft 600 preferably is made of a metal material and accommodated in the housing 100. A first end of the manual shaft 600 is coupled to the output shaft assembly 300, specifically, the second coupling hole 322 formed in the lower portion of the second gear 320, to receive the driving force of the motor part 200.

In addition, the detent lever which shifts the P/R/N/D stages of the transmission according to the input signal from the controller is coupled to a second end of the manual shaft 600, and thus the manual shaft 600 rotates the detent lever to a specific position according to the driving force of the motor part 200.

Consequently, the manual shaft 600 may rotate the detent lever to shift the P/R/N/D stages of the transmission.

Meanwhile, each of the output shaft assembly 300 and the manual shaft 600 preferably is made of a metal material, and the magnet rotor 500 is made of a material such as plastic.

That is, when the output shaft assembly 300 and the manual shaft 600, each of which are made of a metal material, are assembled, owing to a characteristic of the material of the magnet rotor 500, the magnet rotor 500 may prevent a gap between the above components.

Consequently, when the output shaft assembly 300 and the manual shaft 600 are rotated, the magnet rotor 500 made of a material such as plastic may prevent distortion and shake of a shaft.

The Hall sensor 700 is disposed in a region in which a position of the magnetic body 520 mounted in the magnet rotor 500 may be detected inside the housing 100. The Hall sensor 700 detects the magnetic body 520 mounted on the magnet rotor 500 to detect a rotational position of the magnet rotor 500 and transmit the detected information to the controller of the vehicle.

As described above, the support member 400 may support both of the magnet rotor 500 and the motor shaft 220 of the motor part 200 inserted into the output shaft assembly 300 so that the electronic shift lever according to the present disclosure may improve robustness of the output shaft assembly 300 and the magnet rotor 500.

In addition, the lower portion of the second gear 320 is inserted into the magnet rotor 500 and the manual shaft 600 passes through the magnet rotor 500 so that the magnet rotor 500 may be rotated together with the output shaft assembly 300 and may easily transmit the rotational force of the output shaft assembly 300 to the manual shaft 600.

In addition, since the magnetic body 520 is coupled to the mounting groove of the body portion 510 by an insert injection method, when the body portion 510 is rotated, it is possible to effectively prevent the magnetic body 520 from being released from the body portion 510 to the outside due to a centrifugal force.

In addition, the identification groove 530 is formed collinearly with the mounting groove in the lower surface of the body portion 510 in the vertical direction so that, even after the magnet rotor 500 is assembled with the housing 100, a position of the magnetic body 520 mounted on the outer circumferential surface of the body portion 510 may be easily determined. Therefore, when the magnet rotor 500 is coupled to the manual shaft 600 to which a detent lever is coupled, a coupling position of the manual shaft 600 may be easily determined to allow the manual shaft 600 to be coupled to the magnet rotor 500 so as to allow the position of the magnetic body 520 mounted on an outer circumferential surface of the magnet rotor 500 and detected by the Hall sensor 700 to correspond to a rotational position of the detent lever.

In addition, since the oil seal 120 is disposed between the through-hole 110 and the magnet rotor 500, airtightness between the magnet rotor 500 and the through-hole 110 may be maintained so that it is possible to block foreign materials from being introduced into the housing 100 from the outside.

Further, when the output shaft assembly 300 and the manual shaft 600, each of which are made of a metal material, are assembled, due to a characteristic of the material of the magnet rotor 500, the magnet rotor 500 may prevent occurrence of a gap between the above components and, when the output shaft assembly 300 and manual shaft 600 are rotated, the magnet rotor 500 may prevent distortion and shake of the shafts.

In accordance with an electronic shift lever according to the present disclosure, there is an effect of improving robustness of an output shaft assembly and a magnet rotor by allowing a support member to support both of a motor shaft and a magnet rotor of the motor part which are inserted into the output shaft assembly.

In addition, since a lower portion of a second gear is inserted into the magnet rotor and a manual shaft passes through the magnet rotor, there is an effect in that the magnet rotor can be rotated together with the output shaft assembly and a rotational force of the output shaft assembly can be easily transmitted to the manual shaft.

In addition, since a magnetic body is coupled to a mounting groove of a body portion by an insert injection method, when the body portion is rotated, there is an effect which is capable of effectively preventing the magnetic body from being separated from the body portion due to a centrifugal force to the outside.

In addition, an identification groove is formed collinearly with a vertical line of the mounting groove on a lower surface of the body portion so that, even after the magnet rotor is assembled with the housing, there is an effect which is capable of easily determining a position of the magnetic body mounted on an outer circumferential surface of the body portion and, when the magnet rotor is coupled to the manual shaft to which a detent lever is coupled is mounted, there is an effect which is capable of easily determining a coupling position of the manual shaft to allow the manual shaft to be coupled to the magnet rotor so as to allow the position of the magnetic body mounted on an outer circumferential surface of the magnet rotor and detected by a Hall sensor to correspond to a rotational position of the detent lever.

In addition, since an oil seal is disposed between a through-hole and the magnet rotor, there is an effect in that airtightness between the magnet rotor and the through-hole can be maintained so that it is possible to block foreign materials from being introduced into the housing from the outside.

Further, when the output shaft assembly and the manual shaft, each of which are made of a metal material, are assembled, owing to a characteristic of a material of the magnet rotor, there is an effect which is capable of preventing occurrence of a gap between the above components and, when the output shaft assembly and manual shaft are rotated, preventing distortion and shake of shafts.

The present disclosure is not limited to the above-described embodiments, and various modifications may be made without departing from the spirit of the present disclosure.

Although the present disclosure has been described in detail above with reference to the exemplary embodiments, those of ordinary skill in the technical field to which the present disclosure pertains should be able to understand that various modifications and alterations can be made without departing from the technical spirit or essential features of the present disclosure. Therefore, it should be understood that the disclosed embodiments are not limiting but illustrative in all aspects. The scope of the present disclosure is defined not by the above description but by the following claims, and it should be understood that all changes or modifications derived from the scope and equivalents of the claims fall within the scope of the present disclosure.

What is claimed is:

1. An electronic shift lever, comprising:
    a motor part including a case, in which a first insertion hole is formed in an upper portion of the case, and a motor shaft configured to pass through the first insertion hole;
    an output shaft assembly coupled to the motor part and rotated by a driving force of the motor part;
    a manual shaft coupled to the output shaft assembly and configured to receive the driving force of the motor part;
    a support member disposed between the motor part and the output shaft assembly and between a housing and the output shaft assembly;
    a magnet rotor having a first end into which the output shaft assembly is inserted and a second end through which the manual shaft passes;
    a Hall sensor configured to detect a rotational position of the magnet rotor; and
    the housing which accommodates the motor part, the output shaft assembly, the support member, and the Hall sensor.

2. The electronic shift lever of claim 1, wherein the output shaft assembly includes:
    a first gear in which a second insertion hole, through which the motor shaft passes, is formed; and
    a second gear which is in surface contact with the first gear and which includes a first coupling hole into which the motor shaft passing through the first gear is inserted is formed in an upper portion of the second gear and a second coupling hole into which the manual shaft is inserted is formed in a lower portion of the second gear, and
    wherein the support member includes:
    a first bearing disposed between the motor shaft and the first insertion hole;
    a second bearing disposed between the motor shaft and the second insertion hole;
    a third bearing disposed between the motor shaft and the first coupling hole; and
    a fourth bearing disposed between the housing and an outer circumferential surface of the second gear.

3. The electronic shift lever of claim 2, wherein the support member supports the motor shaft against external forces in radial, axial, and tangential directions.

4. The electronic shift lever of claim 2, wherein an inner diameter of the second insertion hole of the first gear is greater than an inner diameter of the first coupling hole of the second gear.

5. The electronic shift lever of claim 1, wherein the magnet rotor includes:
    a body portion which constitutes a body and has a mounting groove formed in an outer circumferential surface of the body portion; and
    a magnetic body mounted in the mounting groove,
    wherein the magnetic body is coupled to the mounting groove by an insert injection method.

6. The electronic shift lever of claim 5, wherein an identification groove is formed collinearly with the mounting groove in a lower surface of the body portion in a vertical direction.

7. The electronic shift lever of claim 1, wherein a first end of the manual shaft is coupled to an output shaft and a second end of the manual shaft is coupled to a detent lever which shifts parking (P)/reverse (R)/neutral (N)/drive (D) stages of a transmission according to an input signal from a controller.

8. The electronic shift lever of claim 1, wherein:
    a through-hole is formed in a lower portion of the housing to allow an interior of the housing to communicate with an outside of the housing; and
    a lower portion of the magnet rotor is mounted in the through-hole.

9. The electronic shift lever of claim 8, wherein an oil seal is disposed between an outer circumferential surface of the lower portion of the magnet rotor and an inner circumferential surface of the through-hole.

* * * * *